United States Patent
Johnson

[15] 3,637,270
[45] Jan. 25, 1972

[54] BEARING GREASING SYSTEM
[72] Inventor: Wesley R. Johnson, Minneapolis, Minn.
[73] Assignee: Sperry Rand Corporation, New York, N.Y.
[22] Filed: Nov. 16, 1970
[21] Appl. No.: 89,723

[52] U.S. Cl. ............................................................308/187
[51] Int. Cl. ..................................................F16c 33/66
[58] Field of Search.........................................308/187

[56] References Cited

UNITED STATES PATENTS 2,164,449   7/1939   Delaval-Crow.........................308/187

*Primary Examiner*—Edgar W. Geoghegan
*Assistant Examiner*—Frank Susko
*Attorney*—Kenneth T. Grace, Thomas J. Nikolai and John P. Dority

[57] ABSTRACT

A method of regreasing bearings on a high-speed rotating magnetic memory drum is disclosed The method includes the use of two inflatable, rubber inner tube rings on both sides of the bearing that is to be greased. With the drum stopped, grease is forced between the two low-pressure inflated rings; one ring is then high-pressure inflated forcing the grease through the bearing into the low-pressure inflated ring side of the bearing; the low-pressure inflated ring is then high-pressure inflated forcing the excess grease to be expelled from the bearing area.

4 Claims, 5 Drawing Figures

INVENTOR
WESLEY R. JOHNSON

BEARING GREASING SYSTEM

BACKGROUND OF THE INVENTION

The present invention relates to bearing greasing systems and in particular to bearing greasing systems applicable to a high-speed rotating magnetic memory drums or disks. In prior art commercial greasing systems, such as machines operating at 3,600 r.p.m. or less, grease is forced under pressure through the machine bearings to flush out the old grease. The old grease is then expelled through an appropriate opening in the bearing housing and the bearings are operated to allow the surplus grease to move out of the bearing housing. In such commercial greasing systems, grease leakage at the bearing shaft is permissible. However, for high-speed magnetic memory drum applications grease leakage into the drum interior cannot be tolerated. Also, at high rotational speed of magnetic memory drums, bearing heating is increased if the bearing is overgreased; thus, there is provided, on both sides of the bearing, an open space to allow surplus grease to easily move out of the bearing housing. It is a primary object of the present invention to overcome these problems of grease leakage along the drum shaft during the greasing process and create open spaces adjacent the bearing housing to allow surplus grease to move therein.

A drum, or disk, magnetic memory system, due to its configuration, creates a pumping action that develops a negative air pressure at the drum journal or shaft. This differential air pressure at the journal, along with the agitation of the bearing grease, causes a higher rate of oil vapor and aerosol to be generated and moved out of the bearing area than is typical for most rotary machinery. Consequently, such rotary memory systems require more frequent grease renewal.

In a rotary memory system that incorporates an air purging system to keep the drum housing interior clean, such air purging system (see my patent application, Ser. No. 844,477 filed July 24, 1969,) increases this flow of oil vapor or aerosol through the bearing due to the increased differential air pressure. The nature of the air purging system is to expel the oil vapor or aerosol to atmosphere out of the drum area; thus, frequent regreasing is required to maintain the desired hours of bearing life. Prior to the present invention, regreasing required a disassembly of the drum with the resultant excessive "downtime."

SUMMARY OF THE INVENTION

The present invention involves the installation of two inflatable rubber inner tube rings on both sides of the bearing and about the drum journal. The two rings are secured, on their outside diameters, against the stationary housing with sufficient clearance provided at their inside diameters, when inflated at atmospheric pressure, to make zero contact with the drum journal. This eliminates the heating due to seal friction at high rotational journal speeds as when conventional rubbing-type ring seals are utilized. The two rings are secured laterally by ring seals that make zero contact with the drum journal.

With the drum stopped, and with both rings inflated at atmospheric pressure, both of the rings are low-pressure inflated sealing off the journal. Grease is then forced, under pressure, between the bearing and one of the low pressure inflated rings; this one low-pressure inflated ring is then high-pressure inflated forcing the grease uniformly through the bearing into the low-pressure inflated ring side of the bearing; the low-pressure inflated ring is then high-pressure inflated forcing the excess grease to be expelled away from the bearing area through an appropriate opening in the stationary housing.

DESCRIPTION OF THE PREFERRED EMBODIMENT

Figure 1:
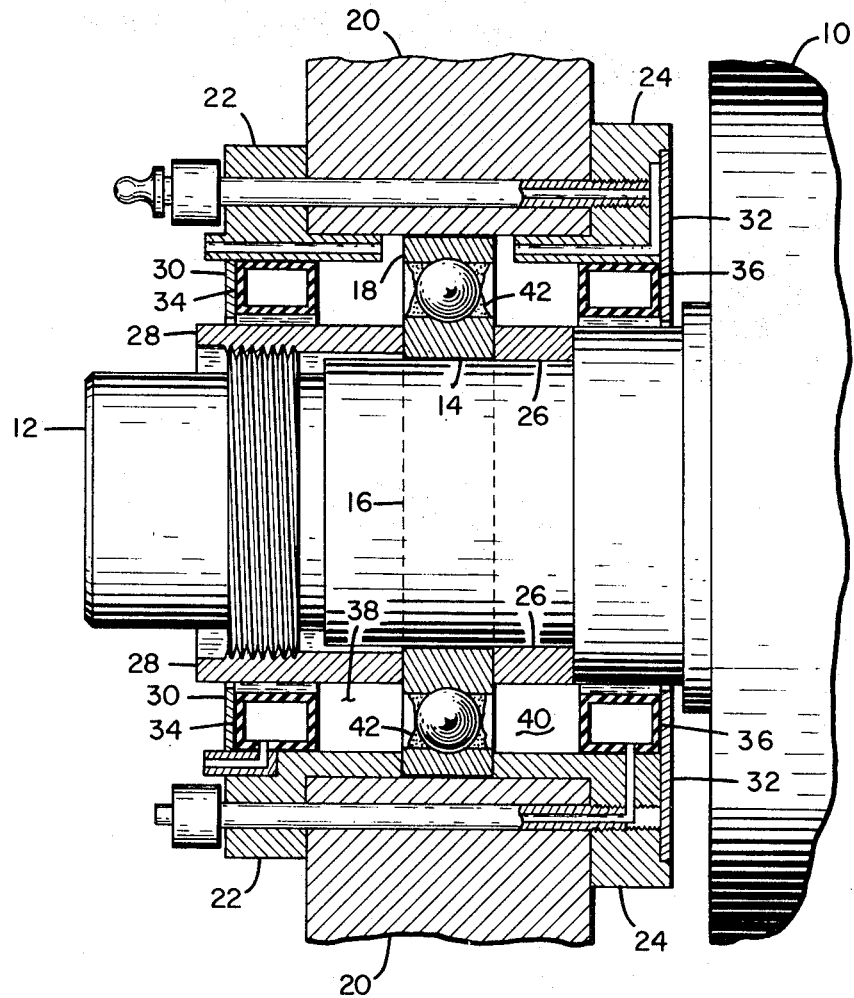
FIG. 1 is a cross-sectional view of the bearing area of a magnetic memory drum in which the present invention is incorporated illustrating the orientation of first and second inflatable rings under atmospheric pressure such as at normal operating speed of the magnetic memory drum.

Step A—With particular reference to FIG. 1 there is presented an illustration of a cross-sectional view of the bearing area of a magnetic memory drum, such as the Univac FH432 drum, in which the present invention is incorporated and illustrating the orientation of first and second inflatable inner tube rings 34 and 36 under atmospheric pressure such as at normal operating speed of the magnetic memory drum 10. This view particularly illustrates the magnetic memory drum 10 and its journal 12 as rotatively supported by the internal race 14 of bearing 16. External race 18 of bearing 16 is, in turn, fixedly supported by stationary housing 20. On either side of housing 20 are clamping rings 22, 24 for fixing the position of external race 18 on housing 20, while on either side of internal race 14 are washer 26 and threaded collar 28 for fixing the position of internal race 14 on journal 12. On the outside flanges of clamping rings 22 and 24 are provided seal rings 30 and 32 which laterally secure inflatable rings 34 and 36 forming the internal spacings 38 and 40 between bearing 16 and seal ring 30 and between bearing 16 and seal ring 32, respectively. These internal spacings, or openings, adjacent either side of bearing 16 are provided by the present invention as a necessary means for compressively forcing grease through bearing 16 and then compressively forcing any excess grease out of the bearing areas.

Figure 2:
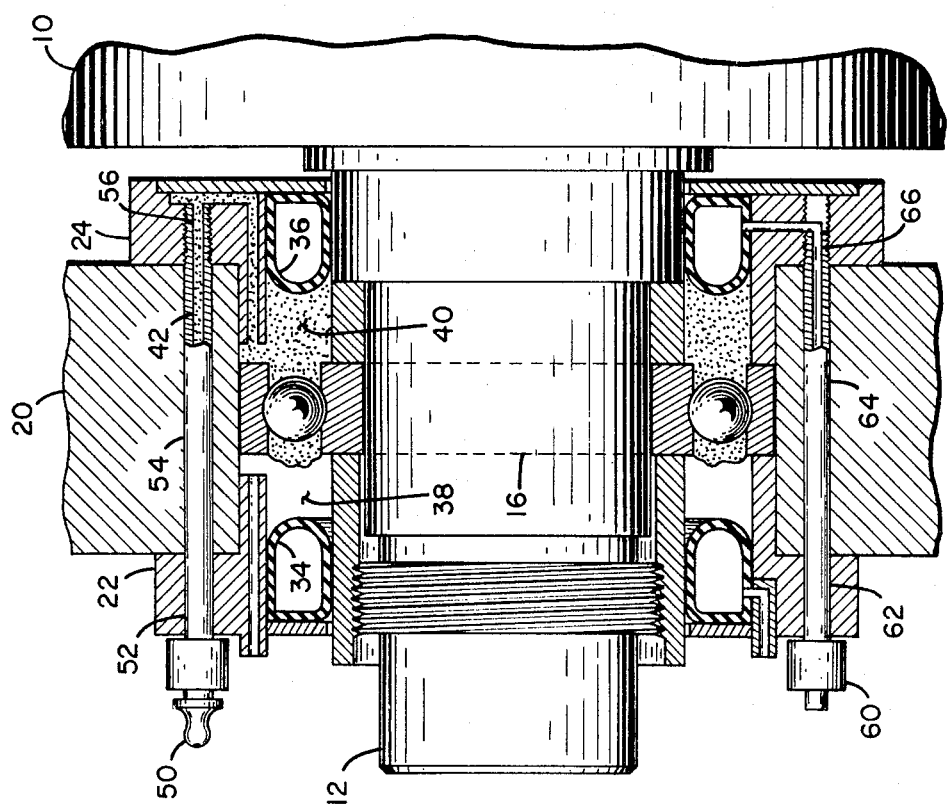
FIG. 2 is an illustration of a view of FIG. 1 when grease has been forced between the low-pressure inflated first ring and the bearing.

Step B—With particular reference to FIG. 2 there is presented an illustration of the view of FIG. 1 after grease 42 has been forced between the low-pressure inflatable ring 36 and bearing 16. During this step of the present invention, with inflatable rings 34, 36 inflated at a low positive air pressure, e.g., 10 pounds per square inch (p.s.i.,) grease 42 is compressively forced into area 40 through grease fitting 50 mounted on clamping ring 22, and then through openings 52, 54, 56 in clamping ring 22, housing 20 and clamping ring 24, respectively. After the completion of step B, grease 42 completely fills area 40 between bearing 16 and inflatable ring 36 with some old, surplus grease being forced out of bearing 16 into area 38 between bearing 16 and inflatable ring 34.

Figure 3:
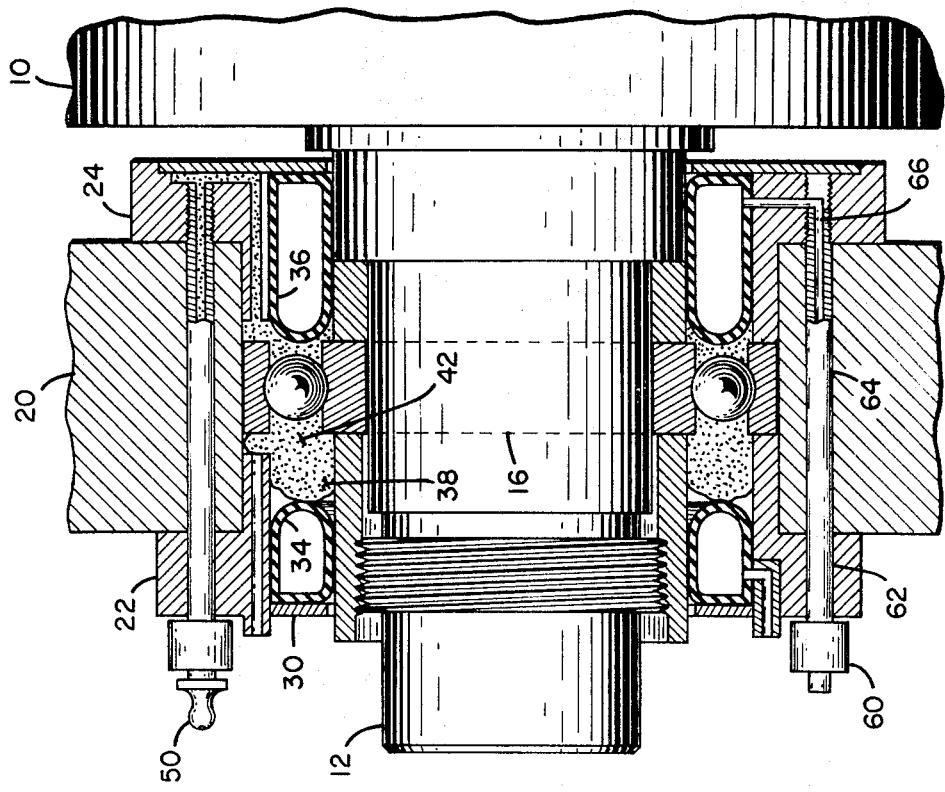
FIG. 3 is an illustration of the view of FIG. 2 when the grease has been forced through the bearing by the high-pressure inflated first ring into the area between the bearing and the low-pressure inflated second ring.

Step C—With particular reference to FIG. 3 there is presented an illustration of the view of FIG. 2 after the grease 42 has been forced out of the area 40 between bearing 16 and inflatable ring 36, through the bearing 16 by the high positive air pressure inflated ring 36 into the area 38 between the bearing 36 and the low positive air pressure inflated ring 30. During this step of the present invention, with inflatable ring 34 still inflated at a low positive air pressure from step B, inflatable ring 36 is inflated to a high positive air pressure, e.g., 30 p.s.i., through air fitting 60 mounted on clamping ring 22, and then through openings 62, 64, 66 in clamping ring 22, housing 20 and clamping ring 24, respectively. Upon the application of a high positive air pressure to inflatable ring 36, ring 36 expands filling area 40 forcing grease 42 out of area 40, uniformly through bearing 16 and into area 38 between bearing 16 and inflatable ring 34. The uniform flow of grease 42 through bearing 16 improves the flushing action of the new grease upon the old grease.

Figure 4:
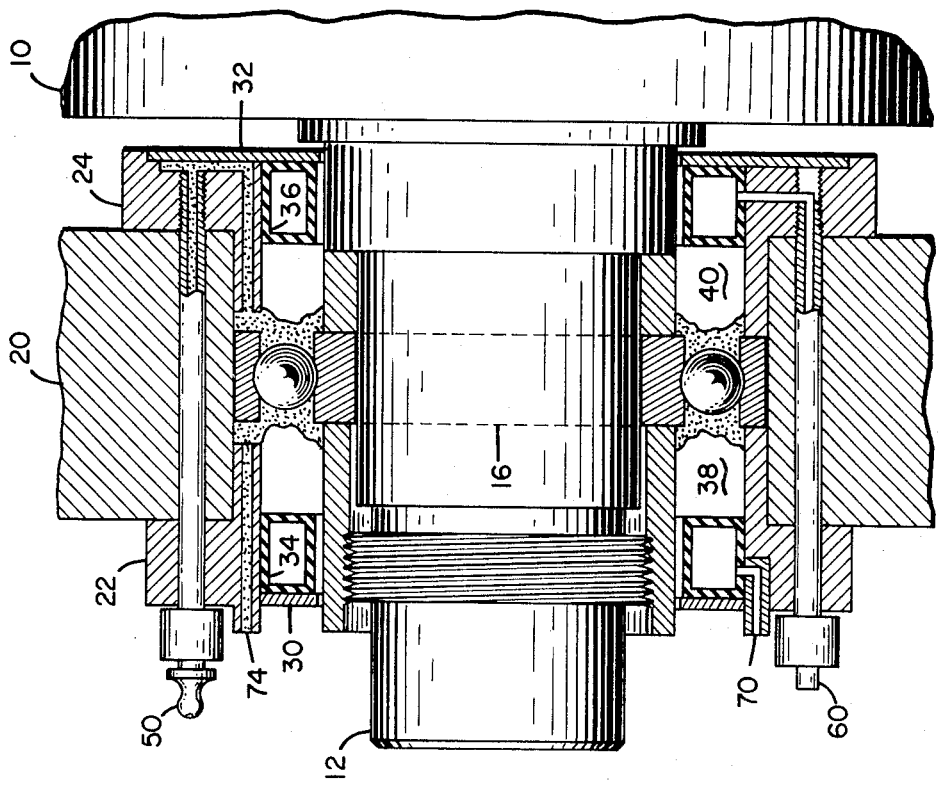
FIG. 4 is an illustration of a view of FIG. 3 when the grease has been expelled from the bearing area by the high-pressure inflated second ring.

Step D—With particular reference to FIG. 4 there is presented an illustration of the view of FIG. 3 after grease 42 has been expelled from area 38 between bearing 16 and inflatable ring 34 has been inflated to a high positive air pressure, e.g., 30 p.s.i., through air fitting 70 mounted on clamping ring 22 and then through opening 72 in clamping ring 22. Upon the application of the high positive air pressure to inflatable ring 34, inflatable ring 34 expands filling area 38 forcing grease 42 out of area 38 through opening 74 in clamping ring 22 and external to the bearing area between sealing rings 30 and 32.

Figure 5:
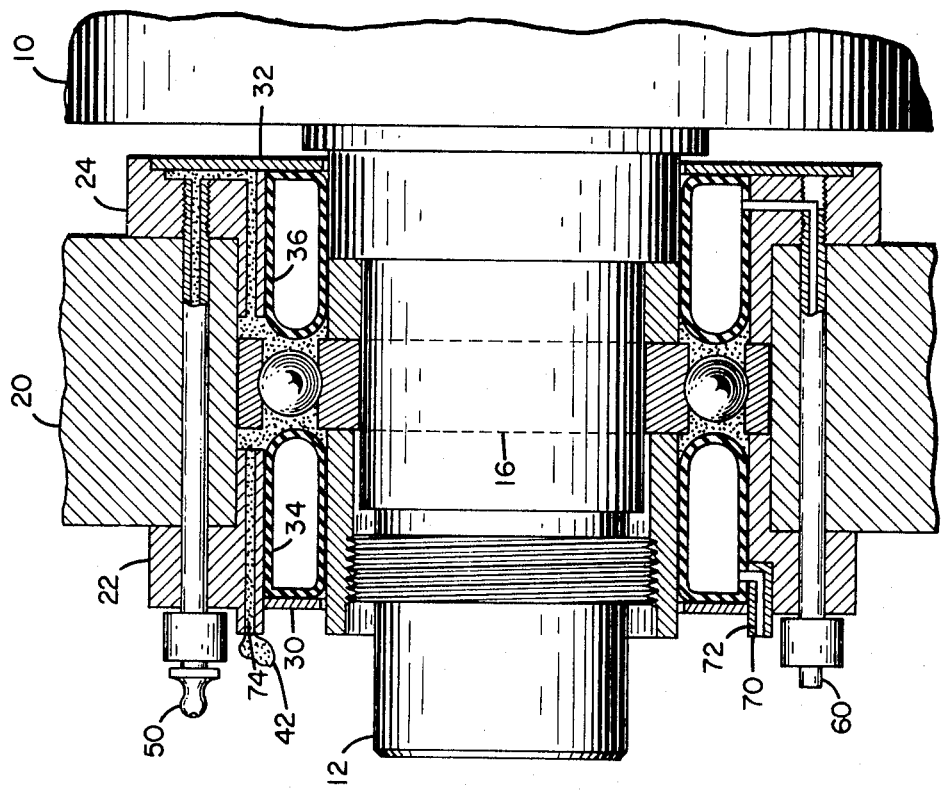
FIG. 5 is an illustration of a view of FIG. 4 after the first and second rings have been deflated to atmospheric pressure as in FIG. 1.

Step E—With particular reference to FIG. 5 there is presented an illustration of the view of FIG. 4 after the inflatable rings 34 and 36 have been deflated to atmospheric pressure returning to the condition substantially as disclosed in FIG. 1. During this step of the present invention, with inflatable rings 34 and 36 still at a high positive air pressure from step D, the air pressure in inflatable rings 34 and 36 are returned to their conditions of step A, FIG. 1. After completion of step E the drum 10 may be brought up to operating speed to permit the excess grease within bearing 16 to move out into areas 38 and 40 provided by the deflation of the corresponding inflatable rings 34 and 36.

What is claimed is:

1. A bearing greasing system, comprising:
   bearing support means having an opening therein;
   bearing means fixed in said opening;
   journal means rotatively supported by said bearing means;
   first and second expansible means installed in said opening on opposite sides of said bearing means, fixed with respect to said opening and making zero contact with said journal means during its normal rotational operation;
   means for forcing grease between said bearing means and said first expansible means;
   means for expanding said first expansible means and forcing excess greases through said bearing means; and,
   means for expanding said second expansible means and forcing said excess grease out of said opening.

2. The system of claim 1 in which said first and second expansible means are pneumatically inflatable tubelike rings.

3. The system of claim 2 in which said first and second expansible means are spaced away from their respective sides of said bearing means for forming first and second open areas.

4. A bearing greasing system in an environment including a bearing support having an opening therein with a bearing fixed in said opening and rotatively supporting a journal, first and second inflatable rings installed in said opening on opposite sides of and spaced away from their respective sides of said bearing for forming associated first and second open areas when inflated at atmospheric pressure, the method comprising:
   stopping the rotation of said journal;
   inflating said first and said second inflatable rings to a low positive air pressure for sealing off said first and second open areas;
   forcing grease into said first open area;
   inflating said first inflatable ring to a high positive air pressure for forcing grease from said first open area into said bearing and excess grease through said bearing into said second open area;
   inflating said second inflatable ring to a high positive air pressure for forcing said excess grease from said second open area out of said opening;
   deflating both said first and second inflatable rings to atmospheric pressure; and then,
   rotating said journal for permitting surplus grease in said bearing to move out of said bearing into said first and second open areas.

* * * * *